(12) United States Patent
Killamsetti et al.

(10) Patent No.: US 11,556,513 B2
(45) Date of Patent: Jan. 17, 2023

(54) GENERATING SNAPSHOTS OF A KEY-VALUE INDEX

(71) Applicant: HEWLETT PACKARD ENTERPRISE DEVELOPMENT LP, Houston, TX (US)

(72) Inventors: Praveen Killamsetti, San Jose, CA (US); Anirudha Kumar, San Jose, CA (US); Rajat Sharma, San Jose, CA (US); Ammar Ekbote, San Jose, CA (US); Kumar Thangavelu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 68 days.

(21) Appl. No.: 16/916,645

(22) Filed: Jun. 30, 2020

(65) Prior Publication Data

US 2021/0406236 A1  Dec. 30, 2021

(51) Int. Cl.
*G06F 16/00* (2019.01)
*G06F 16/22* (2019.01)

(52) U.S. Cl.
CPC ...... *G06F 16/2246* (2019.01); *G06F 16/2291* (2019.01)

(58) Field of Classification Search
None
See application file for complete search history.

(56) References Cited

U.S. PATENT DOCUMENTS

| 8,285,918 | B2 | 10/2012 | Maheshwari |
| 8,566,519 | B2 | 10/2013 | Lay et al. |
| 8,627,026 | B2 | 1/2014 | Domyo et al. |
| 8,719,488 | B2 | 5/2014 | Maheshwari |
| 9,514,054 | B2 | 12/2016 | Speer et al. |
| 9,753,854 | B1 | 9/2017 | Bao |
| 9,910,784 | B2 | 3/2018 | Maheshwari |
| 9,916,241 | B2 | 3/2018 | McKean et al. |

(Continued)

FOREIGN PATENT DOCUMENTS

| CN | 105404596 A | 3/2016 |
| CN | 106708749 | 5/2017 |

(Continued)

OTHER PUBLICATIONS

Jannen, W. et al.; "BetrFS: A Right-optimized Write-optimized File System"; Feb. 16-19, 2015; 16 pages.

Bender, M. A., et al., "An Introduction to Be-trees and Write-Optimization", Oct. 2015, 8 pages.

(Continued)

*Primary Examiner* — Anhtai V Tran
(74) *Attorney, Agent, or Firm* — Trop, Pruner & Hu, P.C.

(57) ABSTRACT

A computer implemented method may include: storing key-value pairs in an index in persistent storage, where indirect nodes of the index include pointers, where each pointer identifies an index portion and includes a generation identifier for the identified index portion, where the index comprises a plurality of snapshots associated with a plurality of generations; receiving a request to read data of a particular snapshot of the index, wherein the particular snapshot is associated with a particular generation of the plurality of generations; in response to the request, performing a traversal starting from a particular root node associated with the particular generation; and providing the requested data based on the traversal.

20 Claims, 14 Drawing Sheets

(56) References Cited

U.S. PATENT DOCUMENTS

| | | | |
|---|---|---|---|
| 9,977,746 | B2 | 5/2018 | Muppalaneni et al. |
| 10,042,710 | B2 | 8/2018 | Mutalik et al. |
| 10,067,796 | B1 | 9/2018 | Metcalf |
| 10,169,365 | B2 | 1/2019 | Maheshwari |
| 10,216,638 | B2 | 2/2019 | Maheshwari et al. |
| 10,372,687 | B1 | 8/2019 | Armangau et al. |
| 10,402,394 | B2 | 9/2019 | Pendharkar et al. |
| 10,776,276 | B2 | 9/2020 | Shergill et al. |
| 11,030,107 | B2 | 6/2021 | Shergill et al. |
| 2011/0023027 | A1 | 1/2011 | Kegel et al. |
| 2011/0040732 | A1 | 2/2011 | Anglin et al. |
| 2011/0246503 | A1 | 10/2011 | Bender et al. |
| 2011/0283048 | A1 | 11/2011 | Feldman et al. |
| 2013/0304991 | A1 | 11/2013 | Boettcher et al. |
| 2013/0339319 | A1 | 12/2013 | Woodward et al. |
| 2014/0351388 | A1 | 11/2014 | Srinivasan et al. |
| 2015/0100717 | A1 | 4/2015 | Bennett et al. |
| 2015/0347477 | A1 | 12/2015 | Esmet |
| 2015/0347547 | A1 | 12/2015 | Kasheff et al. |
| 2017/0212680 | A1 | 7/2017 | Waghulde |
| 2018/0011892 | A1 | 1/2018 | Kimura |
| 2018/0121362 | A1 | 5/2018 | Garg et al. |
| 2018/0150392 | A1 | 5/2018 | Booss et al. |
| 2018/0225315 | A1 | 8/2018 | Boles et al. |
| 2019/0095457 | A1 | 3/2019 | Gupta et al. |
| 2019/0095460 | A1 | 3/2019 | Wang et al. |
| 2019/0129970 | A1 | 5/2019 | Armangau et al. |
| 2019/0164612 | A1 | 5/2019 | Solanki et al. |
| 2019/0370239 | A1 | 12/2019 | Gupta et al. |
| 2020/0089617 | A1 | 3/2020 | Onishi et al. |
| 2020/0089788 | A1 | 3/2020 | Johnson et al. |
| 2020/0151268 | A1 | 5/2020 | Johnson et al. |
| 2020/0233801 | A1 | 7/2020 | Gupta et al. |
| 2020/0241784 | A1 | 7/2020 | Mayo et al. |
| 2020/0250148 | A1 | 8/2020 | Dayan et al. |
| 2020/0341889 | A1 | 10/2020 | Idreos et al. |
| 2020/0341909 | A1 | 10/2020 | Vanninen et al. |
| 2021/0034584 | A1 | 2/2021 | Dalmatov et al. |

FOREIGN PATENT DOCUMENTS

| | | | | |
|---|---|---|---|---|
| CN | 107193758 A | 9/2017 | | |
| EP | 3627343 A1 | * 3/2020 | ......... | G06F 12/0253 |
| WO | 2013/054588 A1 | 4/2013 | | |

OTHER PUBLICATIONS

Bradley C. Kuszmaul, "How Fractal Trees Work," Talk at CRIBB, Nov. 4, 2011, pp. 1-52.

Bradley C. Kuszmaul, "How TokuDB Fractal TreeTM Indexes Work," Guest Lecture in MIT 6.172 Performance Engineering, Nov. 18, 2010, 40 pages.

Callaghan, M., "Read, write & space amplification—pick 2", Nov. 23, 2015, 2 pages.

Dayan, N., et al., "Dostoevsky: Better space-time trade-offs for LSM-tree based key-value stores via adaptive removal of superfluous merging", May 2018, 16 pages.

Dayan, N., et al., "Monkey: Optimal navigable key-value store", May 2017, 16 pages.

Kaiyrakhmet, O. et al., "SLM-Db: Single-level Key-value Store with Persistent Memory", Feb. 25-28, 2019, 16 pages.

Percona, "TokuDB Variables", available online at <https://www.percona.com/d>, printed on Dec. 16, 2019, 30 pages.

Wu, X. et al., "LSM-TRIE: An LSM-tree-based Ultra-large Key-value Store for Small Data", Jul. 8-10, 2015, 13 pages.

Bradley C. Kuszmaul, "A Comparison of Fractal Trees to Log-Structured Merge (LSM) Trees," Apr. 22, 2014, White Paper, pp. 1-15, <http://www.pandademo.com/wp-content/uploads/2017/12/A-Comparison-of-Fractal-Trees-to-Log-Structured-Merge-LSM-Trees.pdf>.

Dayan, N., "Optimal Bloom Filters and Adaptive Merging for LSM-Trees," ACM Transactions on Database Systems, vol. X, No. X, Article X. Publication date: Dec. 2018, pp. 46.

Dayan, N., "The Log-Structured Merge-Bush & the Wacky Continuum," SIGMOD, Jun. 30, 2019, pp. 449-466.

Wei Zha, "Design Issues for SCM-friendly Data Structure," 2017, Flash Memory Summit 2017, <https://www.flashmemorysummit.com/English/Collaterals/Proceedings/2017/20170808_FN11_Zha.pdf>, 26 pages.

Hellerstein, J. M., "Adaptive Query Processing: Technology in Evolution," 2000, IEEE Data Eng. Bull., No. 23, vol. 2, pp. 7-18.

Idreos, S, et. at, "Database Cracking," Jan. 2007, CIDR, vol. 7, pp. 68-78, <https://people.eecs.berkeley.edu/~kubitron/courses/cs262a/handouts/papers/cidr07p07.pdf>.

Idreos, S, et. at, "Past and Future Steps for Adaptive Storage Data Systems: From Shallow to Deep Adaptivity," Springer, Cham, 2015, pp. 85-94, <https://nivdayan.github.io/birte2016.pdf>.

Lun, A.T.L. et al., "S2 Text: Optimizing Hdf5 Chunk Cache Parameters," Apr. 14, 2018, Research Gate, <https://www.researchgate.net/publication/325410777_S2_Text>, 3 pages.

Picorel et al., "Near-Memory Address Translation," 26th International Conference on Parallel Architectures and Compilation Techniques (PACT), 2017, pp. 303-317.

R. Chen, Z. Qin, Y. Wang, D. Liu, Z. Shao and Y. Guan, "On-Demand Block-Level Address Mapping in Large-Scale NAND Flash Storage Systems," in IEEE Transactions on Computers, vol. 64, No. 6, pp. 1729-1741, Jun. 1, 2015.

Ranganathan, S., "Storage Class Memory: What's Next in Enterprise Storage," Sep. 4, 2018, NetApp Blog, <https://web.archive.org/web/20201001062038/https://blog.netapp.com/storage-class-memory-what-is-next-in-enterprisestorage/>, 13 pages.

Byde et al., "Versioned external-memory dictionaries with optimal query/update tradeoffs," Apr. 12, 2011, arXiv preprint arXiv:1103.2566, <https://arxiv.org/pdf/1103.2566.pdf>, pp. 1-11.

Rajib Das, "Update version of COW B-trees and versioning dictionaries," May 2016, ResearchGate, <https://www.researchgate.net/publication/303858138_Update_version_of_COW_B-trees_and_versioning_dictionaries>, pp. 1-21.

Twigg et al., "Stratified B-trees and Versioned Dictionaries," 2011, 3rd Workshop on Hot Topics in Storage and File Systems (HotStorage 11), <https://www.usenix.org/legacy/events/hotstorage11/tech/final_files/Twigg.pdf>, pp. 1-5.

* cited by examiner

GENERATING SNAPSHOTS OF A KEY-VALUE INDEX

BACKGROUND

Computing devices may include components such as a processor, memory, caching system, and storage device. The storage device may include a hard disk drive that uses a magnetic medium to store and retrieve data blocks. Some systems may store or "backup" copies of important data for archival and recovery purposes. For example, in the event that a storage device fails, a backup copy may be used to recover the data that was stored on the failed system. In some examples, backups may be performed periodically to capture copies of the data at various points in time.

BRIEF DESCRIPTION OF THE DRAWINGS

Some implementations are described with respect to the following figures.

Figure 1:
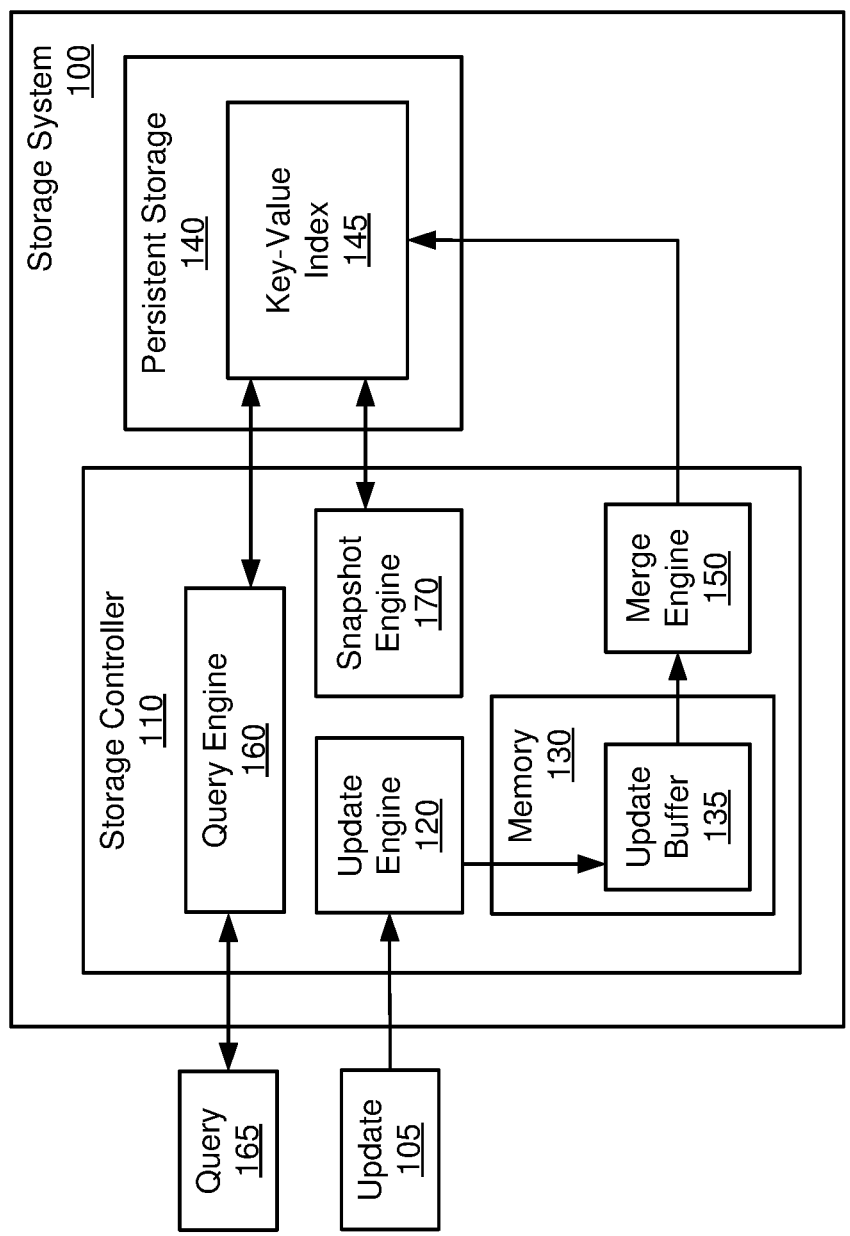
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, storage systems use indexes to indicate relationships or mappings between keys and values (also referred to herein as "key-value pairs"). One example use of a key-value index is a storage system that performs data deduplication based on "fingerprints" of incoming data units, where each fingerprint identifies a particular unit of data. A fingerprint of an incoming data unit is compared to a fingerprint index, which may be a key-value index in which fingerprints are the keys and the corresponding data locations are the values. A match between the fingerprint and a fingerprint stored in the fingerprint index indicates that the incoming data unit may be a duplicate of a data unit already stored in the storage system. If the incoming data unit is a duplicate of an already stored data unit, instead of storing the duplicative incoming data unit, a reference count stored in the storage system can be incremented to indicate the number of instances of the data unit that have been received. In some examples, the key-value index may be in the form of a tree including nodes arranged in a hierarchical manner.

A "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a "snapshot" may represent the state of a data structure (e.g., a key-value index) at a specific point in time. For example, a particular snapshot may be used to recreate or analyze a key-value index as it existed in a particular point in time. However, some snapshots may involve storing multiple copies of each element of an index (e.g., a node), and storing additional data structures to track and identify which copies correspond to each snapshot. Accordingly, a significant amount of processing and disk bandwidth may be required to load the stored data, determine which elements are included in a given snapshot, and use the included elements to generate a particular snapshot.

In accordance with some implementations of the present disclosure, a key-value index may be stored as a tree structure in which each internal node (referred to as an "indirect" node herein) can include a buffer to store key-value pairs (also referred to as a "node buffer"). When the level of the buffer reaches a threshold, the key-value pairs may be transferred to child nodes (e.g., other indirect nodes or leaf nodes). In some implementations, each key-value pair may be associated with a generation identifier that indicates the "generation" of the key-value pair, which may correspond to a particular point or period in time. For example, the generation identifier may be a number of a particular snapshot (e.g., "1" for the first snapshot, "2" for the second snapshot, and so forth). Further, an indirect node may include pointers to the child nodes and/or to portions of its buffer (referred to as buffer chunks). Each pointer may be associated with a generation identifier for the element being pointed to.

In some implementations described herein, providing or reading a snapshot may include performing a traversal of nodes of the index, with the traversal beginning at a root node corresponding to a particular generation. The traversal may involve using the generation identifiers in pointers and key-value pairs to determine the tree structure of the index as it existed at the time of the particular generation. This tree structure can include or "borrow" sub-trees from earlier generations (e.g., a sub-tree that was not modified in the particular generation). Using this tree structure may reduce scanning and loading of data from various generations, and may thus can provide relatively rapid ability to generate snapshot. Further, sharing of nodes across the tree structures of different generations may reduce the amount of resources required to maintain the snapshots (e.g., CPU bandwidth, memory, storage, and so forth). In this manner, some implementations may improve performance of the index. Further, such sharing of sub-trees may optimize other operations such as checksum computation (e.g., incremental computation only for changed parts), replication using incremental changes, deletion of snapshots, and so forth.

1. Storage System Including Key-Value Index with Node Buffers

FIG. 1 shows an example of a storage system 100 that includes a storage controller 110 and persistent storage 140, in accordance with some implementations. As shown, the storage controller 110 may include an update engine 120, a merge engine 150, a snapshot engine 170, memory 130, and a query engine 160. In some examples, the memory 130 may include an update buffer 135, and the persistent storage 140 may include a key-value index 145. In some implementations, the key-value index 145 may include key-value data that is organized as a node tree. An example implementation of the key-value index 145 is described below with reference to FIG. 2. In some examples, the persistent storage 140 may include one or more non-transitory storage media such as hard disk drives (HDDs), solid state drives (SSDs), optical disks, and so forth, or a combination thereof. The memory 130 may include semiconductor memory devices such as dynamic or static random access memories (DRAMs or SRAMs), non-volatile dual in-line memory modules (NVDIMM), and so forth.

In some implementations, the update engine 120 may receive an update 105 for the key-value index 145 in the persistent storage 140. For example, each update 105 may be a key-value pair to be added to the key-value index 145. In some examples, the update engine 120 may store all or a part of the update 105 in an update buffer 135 stored in memory 130. Further, the merge engine 150 may update the key-value index 145 with key-value pairs stored in the update buffer 135. Note that, although just one update buffer 135 is shown in FIG. 1, in other examples, the storage controller 110 can include multiple update buffers 135. In some examples, the memory 130 may be implemented in one or more volatile storage devices.

In some implementations, the query engine 160 may receive a query 165 specifying a given key at a point in time, and may access or interact with the key-value index 145 (and the update buffer 135 in some examples) to determine the value matching the key specified in the query 165. Further, the query engine 160 may return the matching value in response to the query 165. In some examples, the query 165 may be a user-created query (e.g., a read request for a data element).

In some implementations, the snapshot engine 170 may identify or maintain a current generation of the key-value index 145. The current generation may be incremented periodically and/or per request (e.g., user or system command). Each snapshot may correspond to the state of the key-value index 145 at the time that the generation is incremented, and may be associated with the immediately preceding generation. For example, when the current generation is incremented from generation 2 ("G2") to generation 3 ("G3"), a snapshot associated with G2 is finalized or "frozen." Stated differently, the key-value data included in the G2 snapshot cannot be changed once the current generation is incremented to G3. In some examples, a snapshot is considered to be finalized when all pending updates have been performed in the key-value index 145 (i.e., after completing an update process by the merge engine 150).

In some implementations, the snapshot engine 170 and/or the update engine 120 may associate generation identifiers to corresponding elements of the key-value index 145. In some examples, the generation identifier may be specified in a field included in or appended to an element. For example, the update engine 120 may insert generation identifiers in fields associated with key-value pairs that are added or updated in the key-value index 145. Further, in some examples, the update engine 120 may insert generation identifiers in fields included in pointers of the indirect nodes of the key-value index 145 (e.g., pointers to child nodes, pointers to buffer chunks, and so forth). In some examples, the generation identifier is one portion of the address specified in each pointer.

In some implementations, the snapshot engine 170 may provide or read a snapshot by performing a traversal of the key-value index 145 that begins at a root node corresponding to a particular generation. Further, the snapshot engine 170 may use the generation identifiers to determine the tree structure of the key-value index 145 as it existed at the time period associated with the particular generation. In some examples, the determined tree structure can include sub-trees (i.e., sub-portions of the overall tree) that are also included in earlier generations. In this manner, the snapshot engine 170 may provide relatively rapid access to a particular snapshot, and may improve performance associated with generating snapshots. The functionality of the snapshot engine 170 and the key-value index 145 are described further below with reference to FIGS. 2-9.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software instructions and/or firmware instructions stored on at least one machine-readable storage medium) executable on the hardware processing circuit.

2. Example Key-Value Index Using Node Buffers

Figure 2:
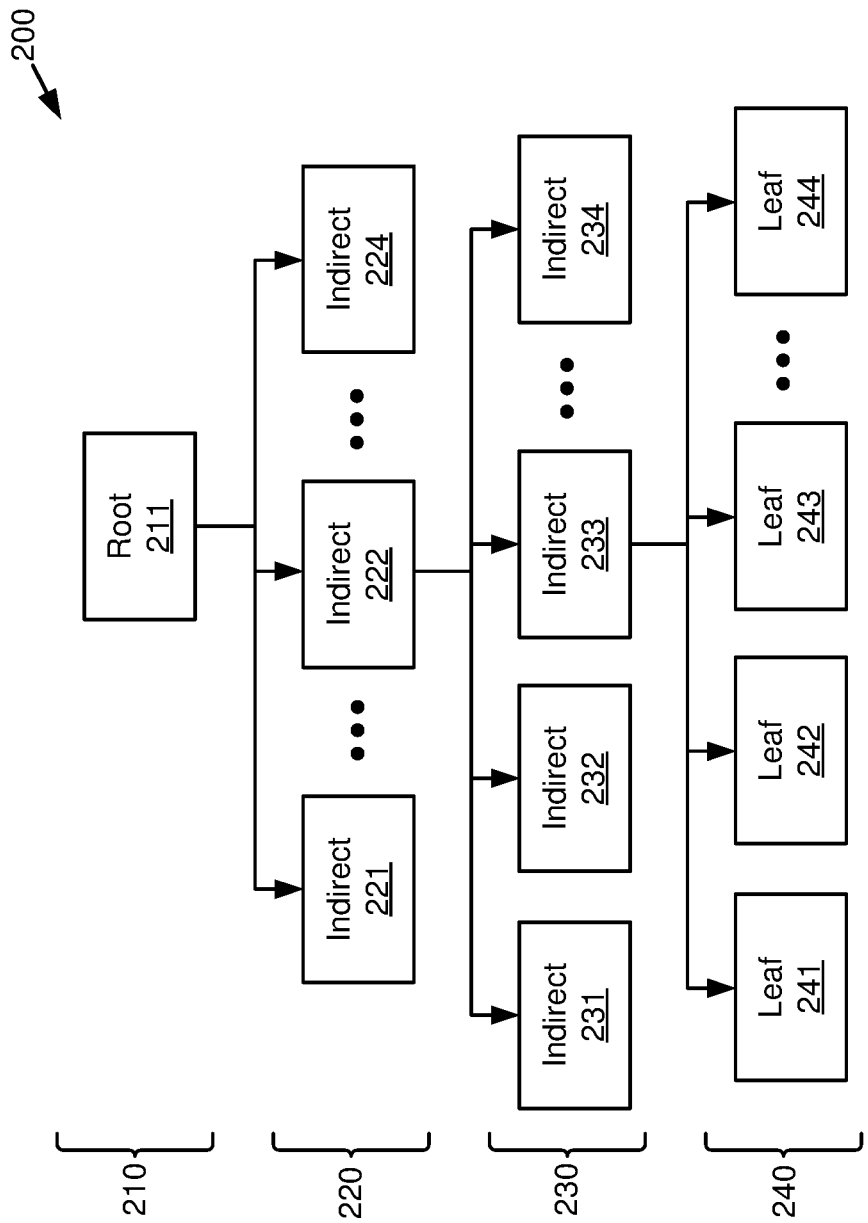
FIG. 2 is an illustration of an example key-value index, in accordance with some implementations.

FIG. 2 shows an illustration of an example key-value index 200, in accordance with some implementations. In some examples, the key-value index 200 may correspond generally to an example implementation of the key-value index 145 (shown in FIG. 1). Further, in some examples, the key-value index 200 may be generated by the storage controller 110 (shown in FIG. 1). In some examples, the key-value index 200 may map fingerprints of data units to locations of those data units. In other examples, the key-value index 200 may be a block index that maps a volume or offset to a combination of a generation identifier and a storage location identifier (e.g., sequential block number). In still other examples, the key-value index 200 may be a disk index that maps different types of blocks to their disk locations, along with other information (e.g., a full fingerprint, a compressed size of the block, etc.). Other combinations of the above or variations thereof are also possible.

As shown in FIG. 2, the key-value index 200 may be arranged in a tree structure including multiple nodes. The nodes may be organized in various levels that form parent-child relationships. For example, a first level 210 may include a root node 211, and a second level 220 may include indirect nodes 221-224 that are children of the root node 211. Further, a third level 230 may include indirect nodes 231-234 that are children of indirect node 222 (in second level 220), and a fourth level 240 may include leaf nodes 241-244 that are children of indirect node 233 (in third level 230). In some examples, the number of child nodes that are related to each parent node may be specified by a fan-out parameter associated with the key-value index 200.

In examples herein, each node of a key-value index may be either a leaf node or an indirect node (i.e., any node other than a leaf node, including the root node). In some implementations, each indirect node of the key-value index 200 (e.g., root node 211, indirect nodes 221-224, indirect nodes 231-234) may include a buffer (also referred to herein as a "node buffer," and not shown in FIG. 2) to store key-value data. In some examples, each leaf node of the key-value index 200 may store key-value data. An example implementation of an indirect node including a node buffer is described below with reference to FIG. 3A.

In some implementations, the nodes of the key-value index 200 may be generated in stepwise fashion from the top to the bottom of the tree structure. For example, upon initializing the key-value index 200 (e.g., at time of first use), the key-value index 200 may only include the root node 211. In this example, the key-value pairs added to the key-value index 200 may be stored in a node buffer of root node 211.

In some implementations, when the key-value data stored in the node buffer of root node 211 reaches a threshold level (e.g., a particular number of stored key-value pairs, a particular percentage of the total capacity, and so forth), a compaction process may be triggered. As used herein, "compaction" may refer to transferring key-value data from a parent node to one or more child nodes. In some examples, the first time that root node 211 is compacted, the indirect nodes 221-224 (i.e., the immediate children of the root node 211) may be generated. Further, each time that root node 211 is compacted, the key-value data stored in the node buffer of root node 211 may be transferred to the node buffers of indirect nodes 221-224. As used herein, "transferring" data refers to moving the data to a destination node, such that the data is no longer present in a source node. In some examples, each of the indirect nodes 221-224 may be associated with a different portion of the range of keys in the node buffer of root node 211. Accordingly, in such examples, each of the key-value pairs of root node 211 may be distributed to a different one of the child nodes 221-224 according to the range associated with each child node. Once the compaction of root node 211 is completed, the node buffer of root node 211 is empty, and thereafter any new key-value updates that are received at the root node 211 will be stored in the node buffer of root node 211. In some examples, a "partial compaction" of the root node 211 results in the node buffer being partially empty to accommodate at least some key-value updates.

In some implementations, the compaction process described above may be similarly repeated for each indirect node. For example, the first time that indirect node 222 is compacted (i.e., when the node buffer of indirect node 222 reaches a threshold), the indirect nodes 231-234 (i.e., the immediate children of the indirect node 222) may be generated, and the key-value data stored in the node buffer of indirect node 222 may be transferred to the node buffers of indirect nodes 231-234. In another example, the first time that indirect node 233 is compacted, the leaf nodes 241-244 (i.e., the immediate children of the indirect node 233) may be generated, and the key-value data stored in the node buffer of indirect node 233 may be transferred to the leaf nodes 241-244.

In some implementations, the key-value index 200 may store each key and corresponding value as two separate stored elements. However, implementations are not limited in this regard. For example, in some implementations, the key may be implied or indicated by the offset or location of the corresponding value within a node or storage element. In such implementations, a "key-value pair" may refer to a stored value associated with an implicit key.

Note that, although not shown in FIG. 2 for the sake of clarity, other indirect nodes could have child nodes in various levels of the key-value index 200. For example, indirect node 221 could have multiple child nodes in the third level 230, indirect node 234 could have multiple child nodes in the fourth level 240, and the like throughout the key-value index 200 over time.

In some implementations, the key-value index 200 may include multiple root nodes that form multiple tree structures (not shown in FIG. 2). The multiple tree structures may share sub-portions (e.g., a subset of nodes), and may correspond to different generations of the key-value index 200. Each of these tree structures may be used to provide a snapshot of the state of the key-value index 200 at a given point in time. The generation of snapshots is discussed further below with reference to FIGS. 3A-9.

3. Example Nodes of Key-Value Index

Figure 3A:
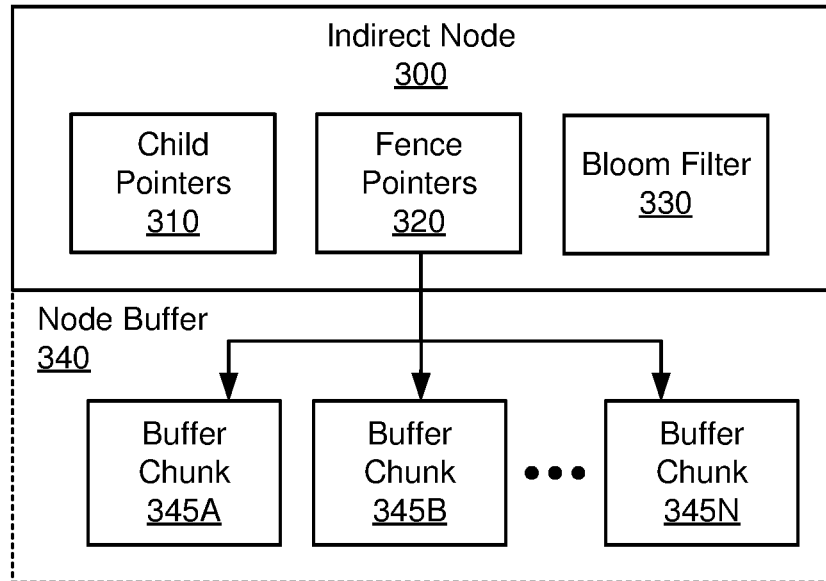
FIGS. 3A-3B are illustrations of example nodes of a key-value index, in accordance with some implementations.

FIG. 3A shows an illustration of an example indirect node 300, in accordance with some implementations. The indirect node 300 may correspond generally to an example implementation of any of the indirect nodes shown in FIG. 2 (e.g., root node 211, indirect nodes 221-224, and/or indirect nodes 231-234). As shown in FIG. 3A, the indirect node 300 may include some or all of child pointers 310, fence pointers 320, a Bloom filter 330, and/or a node buffer 340.

In some implementations, the node buffer 340 may include multiple buffer chunks 345A-345N (also referred to herein as "buffer chunks 345") to store key-value data (e.g., a fingerprint of a data unit and corresponding storage location indicator for that data unit 107). The buffer chunks 345A-345N may be arranged in order according to the keys (e.g., in numerical order, in alphabetical order, and so forth). For example, buffer chunk 345A may store key-value data for a lowest range of keys, while buffer chunk 345N may store key-value data for a highest range of keys. In some examples, each of the buffer chunks 345 may be of equal or similar size (e.g., 32 kb, 64 kb, etc.). In some implementations, the sizing of the node buffer 340 may be determined based on a level ratio. In some examples, the level ratio may be a fixed ratio between total buffer sizes in two adjacent levels of a key-value index. Further, the level ratio may be determined based on user-specified parameter(s) to tune the level of write amplification associated with the key-value index.

In some implementations, the child pointers 310 may point to or otherwise identify any nodes that are immediate children of the indirect node 300. For example, referring to the key-value index 200 (shown in FIG. 2), the root node 211 may include respective child pointers 310 that point to each of the indirect nodes 221-224 (i.e., the immediate children of the root node 211). In some examples, the child pointers 310 may be generated the first time that the indirect node 300 is compacted (e.g., when the node buffer 340 reaches a predefined threshold level).

In some implementations, the Bloom filter 330 may allow determination of which keys are not included in the node buffer 340 and which keys may be included in the node buffer 340 (i.e., with a possibility of false positives). Stated differently, the Bloom filter 330 indicates the keys that are not included in the node buffer 340, and indicates the keys that might be included in the node buffer 340 with the possibility of providing a false positive indication for at least some keys (i.e., indicating that a key is included in the node buffer 340 when it is not). Accordingly, if the Bloom filter 330 indicates that a particular key is not included in the node buffer 340, it is possible to avoid processing time and/or bandwidth associated with loading that node buffer 340 into memory and searching for that particular key, since use of the Bloom filter 330 may accurately indicate when the key is not included in the node buffer 340. In contrast, if the Bloom filter 330 indicates that a particular key is included in the node buffer 340, the node buffer 340 can then be searched for that particular key. In some implementations, the Bloom filters 330 at various levels of an index may be sized such that the Bloom filters 300 in indirect nodes 300 at higher levels (i.e., nearer to the root node) are associated with relatively lower false positive ratios than those at lower levels (i.e., nearer to the leaf nodes).

In some implementations, when searching the node buffer 340 for a particular key, the fence pointers 320 may be used to identify a particular buffer chunk 345 that is likely to store data associated with the particular key. In some examples, the fence pointers 320 may identify the lowest and/or highest key values of each buffer chunk 345. For example, each fence pointer 320 may identify the lower bound of key values included in a corresponding buffer chunk 345. Therefore, the fence pointers 320 may be used to identify which buffer chunk 345 includes the key range that the searched key falls into. Accordingly, instead of loading the entire node buffer 340 into memory, only the identified buffer chunk 345 needs to be loaded into memory. In this manner, the fence pointers 320 may reduce read amplification associated with the indirect node 300.

In some implementations, the buffer chunks 345 may be stored together or in separate data blocks. Further, the buffer chunks 345 may be stored separately from the remaining elements of the indirect node 300 (i.e., child pointers 310, fence pointers 320, and/or Bloom filter 330). In some examples, the child pointers 310, fence pointers 320, and the Bloom filter 330 may be loaded into memory prior to loading any of the buffer chunks 345 into memory. Further, if the Bloom filter 330 indicates that a searched key is included in the node buffer 340, the fence pointers 320 may be used to identify a single buffer chunk 345, and only that identified buffer chunk 345 is then loaded into memory.

In some implementations, the child pointers 310 and/or the fence pointers 320 may be associated with generation identifiers (not shown in FIG. 3A) for the elements being pointed to. For example, a child pointer 310 may include a generation identifier that indicates a particular generation in which the corresponding child node (i.e., the child node pointed to by that child pointer 310) was last changed (e.g., generated or updated). In another example, a fence pointer 320 may include a generation identifier that indicates a particular generation in which the corresponding buffer chunk 345 was last changed.

Figure 3B:
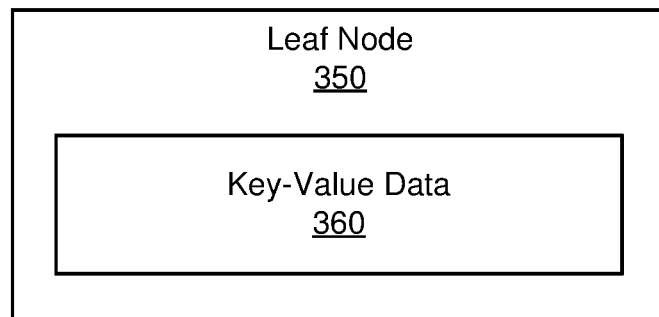

FIG. 3B shows an illustration of an example leaf node 350, in accordance with some implementations. The leaf node 350 may correspond generally to an example implementation of any of the leaf nodes shown in FIG. 2 (e.g., leaf nodes 241-244). As shown in FIG. 3B, the leaf node 350 may include key-value data 360. In some implementations, each key-value pair in the key-value data 360 may be associated with a generation identifier (not shown in FIG. 3B), which indicates a particular generation in which that key-value pair was last changed.

4. Example Tree Structures for Snapshots

FIGS. 4A-4D show example tree structures, in accordance with some implementations. In some examples, the tree structures illustrated in FIGS. 4A-4D may be used by the snapshot engine 170 (shown in FIG. 1). Further, in some examples, the tree structures shown in FIGS. 4A-4D may correspond generally to the state of a key-value index (e.g., key-value index 200 shown in FIG. 2) at a given point in time.

Figure 4A:
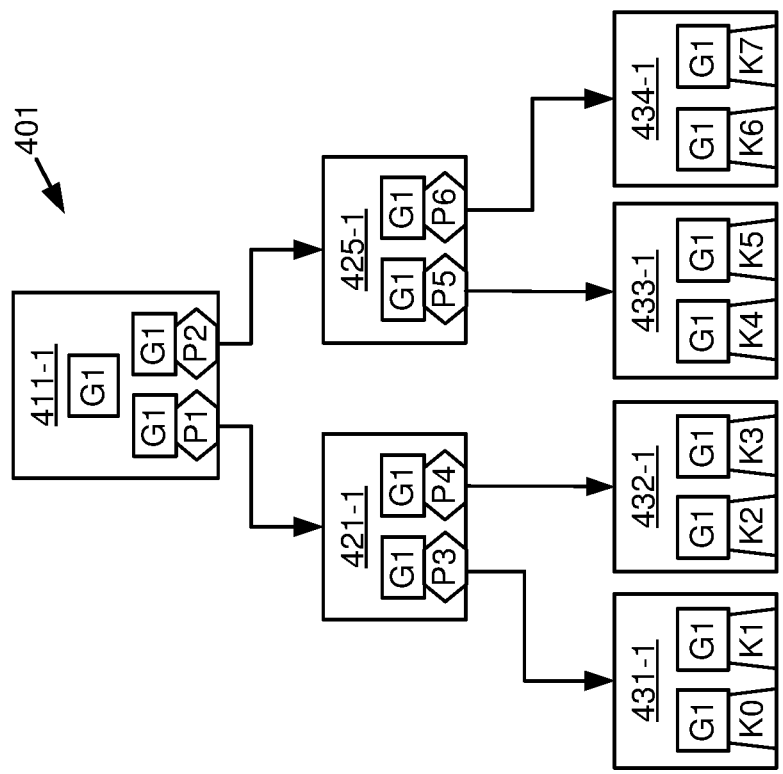
FIGS. 4A-4E are illustrations of example tree structures, in accordance with some implementations.

Referring to FIG. 4A, shown is a first tree structure 401 at a first point in time. The first tree structure 401 includes a root node 411-1, indirect nodes 421-1 and 425-1, and leaf nodes 431-1, 432-1, 433-1, and 434-1. Note that FIG. 4A only shows two children of each indirect node for the sake of clarity, and implementations are not limited in this regard. Note also that, while not shown in FIG. 4A for the sake of clarity, any of the indirect nodes (e.g., root node 411-1 and indirect nodes 421-1) could include a node buffer, a Bloom filter, and so forth (as illustrated in FIG. 3A).

Assume that FIG. 4A represents the state of a key-value index as it exists immediately prior to incrementing the current generation from a first generation ("G1") to a second generation ("G2"), and that no updates to the index are pending (e.g., in update buffer 135 shown in FIG. 1). Accordingly, the first tree structure 401 corresponds to a snapshot for the first generation G1, and may be referred to herein as the "G1 snapshot." In some implementations, the snapshot engine 170 (shown in FIG. 1) may read data of the G1 snapshot by traversing the first tree structure 401 in a key-value index (e.g., key-value index 200 shown in FIG. 2). The key-value index may include nodes (i.e., root nodes, indirect nodes, and leaf nodes) that correspond to different generations. In some implementations, the traversal process for reading data of the G1 snapshot may begin by identifying a specific root node (e.g., root node 411-1) that is associated with the "G1" generation identifier. As shown in FIG. 4A, in some implementations, the root node 411-1 may include a G1 generation identifier that applies to the node as a whole (also referred to as a "node-level generation identifier"). However, in other implementations, the root node associated with G1 may be identified by a pointer to root node 411-1 that includes the G1 generation identifier (e.g., as part of the address or identifier of the root node 411-1).

After identifying the root node 411-1, the traversal process for reading the G1 snapshot may continue by following the child pointers P1 and P2 to identify the child indirect nodes 421-1 and 425-1. As shown, each of the child pointers P1 and P2 is associated with the G1 generation identifier, thereby indicating that the child indirect nodes 421-1 and 425-1 are each associated with the first generation G1. Note that, while FIG. 4A shows the G1 generation identifier as appended to the pointers P1 and P2 for the sake of illustration, implementations are not limited in this regard. For example, each pointer may include a field that is populated with the generation identifier. In another example, the generation identifier may be a portion of the target identifier of each pointer. Other examples are possible.

Next, the traversal process for reading the G1 snapshot may continue by following the child pointers P3, P4, P5, and P6 to respectively identify the child leaf nodes 431-1, 432-1, 433-1, and 434-1. As shown, the child pointers P3, P4, P5, and P6 are associated with the G1 generation identifier, thereby indicating that the leaf nodes 431-1, 432-1, 433-1, and 434-1 are associated with the first generation G1. Further, as shown, the leaf nodes 431-1, 432-1, 433-1, and 434-1 variously include the key-value pairs K0-K7. As used herein, the notation "K0" refers to a key-value pair for key 0, the notation "K7" refers to a key-value pair for key 7, and so forth. Each of the key-value pairs K0-K7 are associated with the G1 generation identifier, thereby indicating that each of these key-value pairs is associated with the first generation G1. In the example of FIG. 4A, the first tree structure 401 is a snapshot of the key-value index associated with the first generation G1 (i.e., the "G1 snapshot").

Figure 4B:
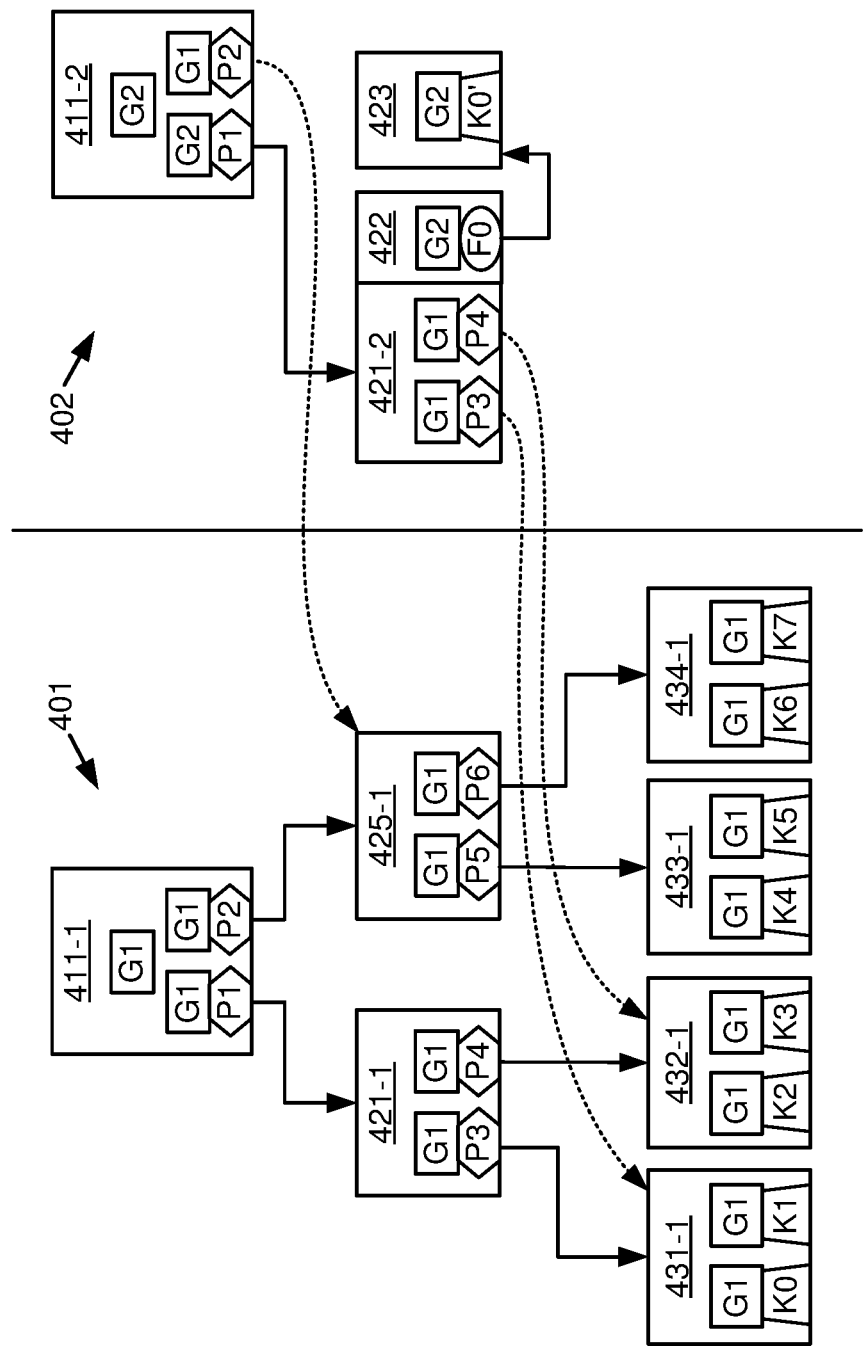

Referring now to FIG. 4B, shown are the first tree structure 401 and a second tree structure 402 at a second point in time (e.g., subsequent to the first point in time of FIG. 4A). Assume that FIG. 4B represents that state of the key-value index as it exists during a second generation G2, but prior to subsequent updates that occur during the second generation G2. Stated differently, the second tree structure 402 is not yet finalized for the second generation G2, and therefore does not represent a snapshot for the second generation G2.

In the example of FIG. 4B, the first and second tree structures 401 and 402 may both be included in a data store of the key-value index (e.g., persistent storage 140 shown in FIG. 1). Accordingly, the data store may simultaneously include two different root nodes 411-1 and 411-2 that correspond to the first and second generations G1 and G2. In some implementations, the root node 411-2 associated with the second generation G2 was created when the current generation of the index was incremented from G1 to G2.

As shown in FIG. 4B, the child pointer P2 of the second root node 411-2 is associated with a G1 generation identifier, thereby indicating that the child indirect node 425-1 is associated with the first generation G1. Note that the indirect node 425-1 has not changed since generation G1, and therefore is still associated with a G1 generation identifier. Further, the child leaf nodes 433-1 and 434-1 also have not changed since generation G1, and therefore the child pointers P5 and P6 of the indirect node 425-1 are also associated with the G1 generation identifier.

As shown in FIG. 4B, the second tree structure 402 does not include another copy of the indirect node 425-1, but instead "borrows" the indirect node 425-1 from the first tree structure 401 (indicated by an arrow with dotted line). Accordingly, the first and second tree structures 401 and 402 share a sub-portion, namely the indirect node 425-1 and its child leaf nodes 433-1 and 434-1. Note that this sub-portion of the second tree structure 402 (associated with the second generation G2) includes pointers and key-value pairs that are not associated with the G2 generation identifier (e.g., pointer P5, key-value pair K4, etc.). Accordingly, in some implementations, such elements having an identifier from an earlier generation may also be included in the second tree structure 402 because they are included in the traversal beginning at the second root node 411-2 (associated with the G2 generation).

Referring again to the second root node 411-2, the child pointer P1 is associated with a G2 generation identifier, thereby indicating that the child indirect node 421-2 is associated with the second generation G2. Accordingly, one change that has occurred in the key-value index is that the indirect node 421-1 has been replaced with a different indirect node 421-2. Specifically, in contrast to the indirect node 421-1, the indirect node 421-2 includes a set of fence pointers 422 and a buffer chunk 423. In particular, the fence pointers 422 include a fence pointer FO that points to the buffer chunk 423 and is associated with a G2 generation identifier. Further, the buffer chunk 423 includes a key-value pair K0' that is also associated with a G2 generation identifier. In the example of FIG. 4B, the key-value pair K0' represents an update to key-value pair K0 (included in leaf node 431-1 of the first tree structure 401), and therefore indicates that the value paired to key 0 has changed from generation G1 to generation G2. Note that the key-value index simultaneously includes two different values paired with key 0 (i.e., K0 and K0') which correspond to the first and second generations G1 and G2.

As discussed above, the indirect node 421-2 includes elements associated with generation G2 (i.e., the fence pointer FO and the key-value pair K0' in the buffer chunk 423), and therefore the indirect node 421-2 is associated with a G2 generation identifier. However, note that the child pointers P3 and P4 of the indirect node 421-2 point to the leaf nodes 431-1 and 432-1 of the first tree structure 401, and therefore the child pointers P3 and P4 are associated with a G1 generation identifier. Accordingly, the first and second tree structures 401 and 402 share other sub-portions, namely the leaf nodes 431-1 and 432-1.

Figure 4C:
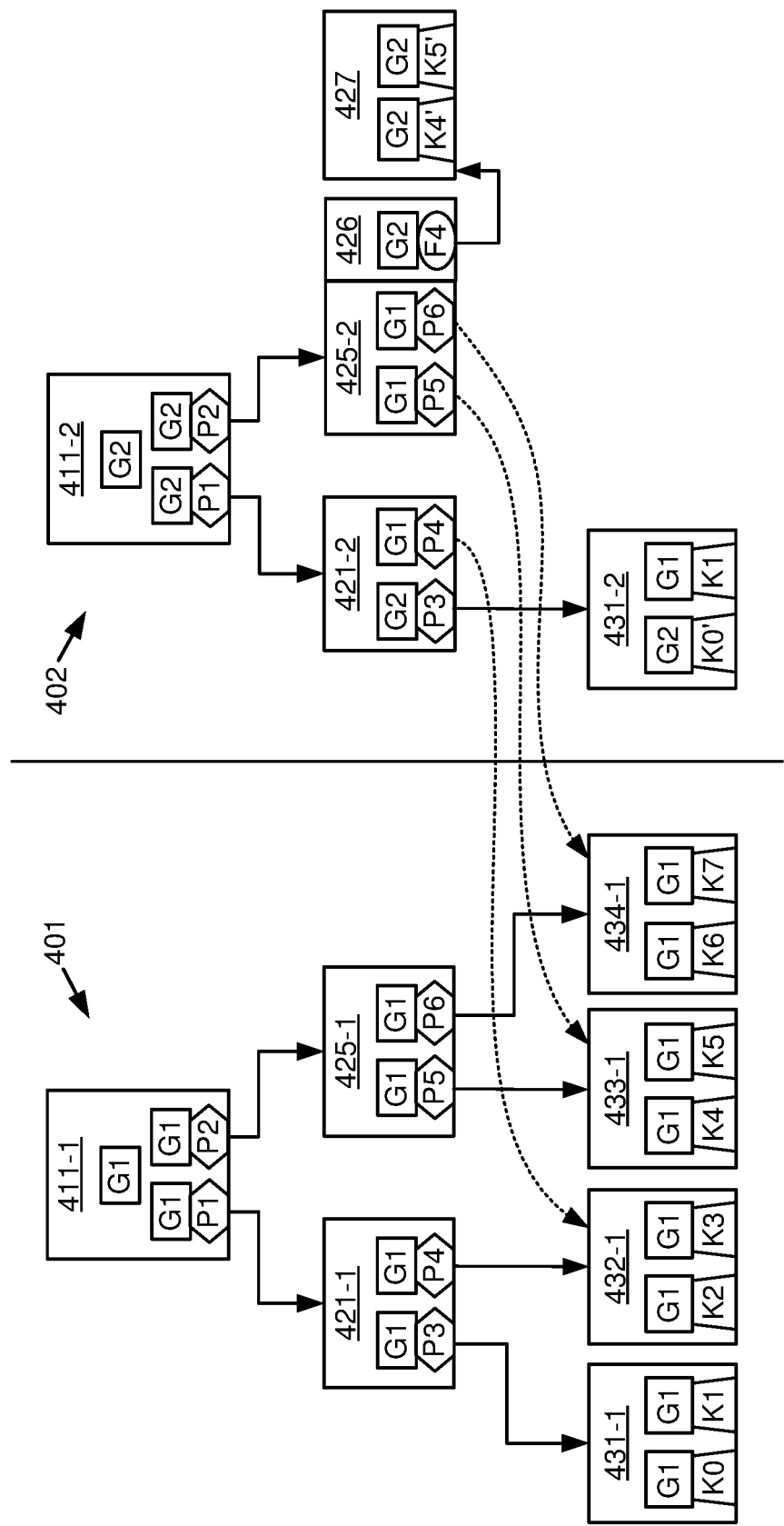

Referring now to FIG. 4C, shown are the first tree structure 401 and the second tree structure 402 at a third point in time (e.g., subsequent to the second point in time of FIG. 4B). Assume that FIG. 4C represents the state of the key-value index as it exists immediately prior to incrementing the current generation from the second generation G2 to a third generation G3, and that no updates to the index are pending. Accordingly, the second tree structure 402 as shown in FIG. 4C represents a snapshot for the second generation G2, and may be referred to herein as the "G2 snapshot."

As shown in FIG. 4C, the child pointers P1 and P2 of the second root node 411-2 are both associated with a G2 generation identifier, thereby indicating that the child indirect nodes 421-2 and 425-2 are both associated with the second generation G2. Note that the indirect node 425-2 includes a set of fence pointers 426 and a buffer chunk 427. In particular, the fence pointers 426 include a fence pointer F4 that points to the buffer chunk 427 and is associated with a G2 generation identifier. Further, the buffer chunk 427 includes key-value pairs K4' and K5' that are associated with a G2 generation identifier. In the example of FIG. 4C, the key-value pairs K4' and K5' represent updates to the key-value pairs K4 and K5 (included in leaf node 433-1 of the first tree structure 401), and therefore indicates that the values paired to keys 4 and 5 have changed from generation G1 to generation G2.

Note that the indirect node 421-2 shown in FIG. 4B (discussed above) includes a child pointer P3 associated with a G1 generation identifier, a fence pointer FO associated with a G2 generation identifier, and a buffer chunk 423 storing a key-value pair K0' associated with a G2 generation identifier. However, in the third point in time illustrated in FIG. 4C, the key-value pair K0' is no longer stored in the buffer chunk 423 of the indirect node 421-2, but rather is stored in the leaf node 431-2. Further, the child pointer P3 is associated with the G2 generation identifier, thereby indicating that the leaf node 431-2 is now associated with the second generation G2. In some implementations, the transfer of the key-value pair K0' from the buffer chunk 423 to the leaf node 431-2 may occur during a compaction of the indirect node 421-2.

Note also that the leaf node 431-2 (including key-value pair K0') is different from the leaf node 431-1 (including key-value pair K0). Therefore, in the example of FIG. 4C, the first and second tree structures 401 and 402 can no longer share the leaf node 431-1 (as shown in FIG. 4B). Accordingly, the leaf node 431-1 is stored for the G1 snapshot, and the leaf node 431-2 is stored for the G2 snapshot).

Further, as shown in FIG. 4C, the leaf nodes 432-1, 433-1, and 434-1 have not changed since generation G1. Accordingly, the child pointer P4 (of indirect node 421-2) and child pointers P5 and P6 (of the indirect node 425-2) are still associated with the G1 generation identifier. Accordingly, the first and second tree structures 401 and 402 share the leaf nodes 432-1, 433-1, and 434-1 (indicated by arrows with dotted line).

Figure 4D:
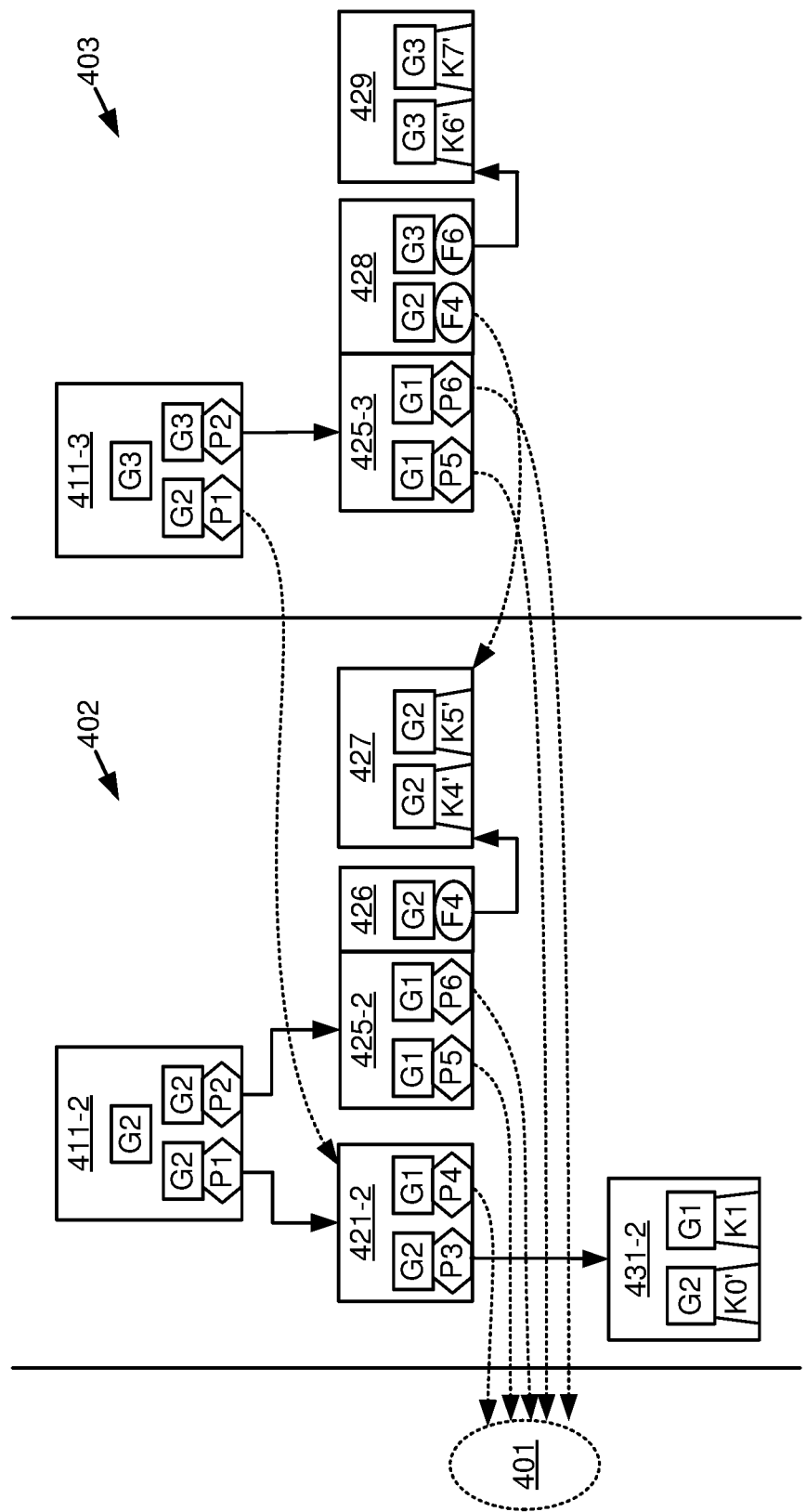

Referring now to FIG. 4D, shown are the second tree structure 402 and a third tree structure 403 at a fourth point in time (e.g., subsequent to the third point in time of FIG. 4C). Assume that FIG. 4D represents that state of the key-value index as it exists during the generation G3. Note that the second tree structure 402 shown in FIG. 4D is unchanged from that shown in FIG. 4C. Stated differently, the second tree structure 402 shown in FIGS. 4C-4D was finalized for the second generation G2, and therefore represents the G2 snapshot.

As shown, the third tree structure 403 includes the root node 411-3 that corresponds to the third generation G3. Further, the third tree structure 403 may share sub-portions with the first tree structure 401 and the second tree structure 402 (indicated by arrows with dotted line). Furthermore, as previously discussed with reference to FIG. 4C, the second tree structure 402 may share sub-portions with the first tree structure 401.

As shown in FIG. 4D, the child pointer P1 of the third root node 411-3 is associated with a G2 generation identifier, thereby indicating that the child indirect node 421-2 is associated with the second generation G2. Accordingly, the third tree structure 403 does not include another copy of the indirect node 421-2, but instead borrows the indirect node 421-2 from the second tree structure 402. Further, the third tree structure 403 also borrows the leaf nodes identified by child pointers of the indirect node 421-2, namely the leaf node 431-2 (included in the second tree structure 402) and the leaf node 432-1 (included in the first tree structure 401).

Note that, in the example of FIG. 4D, the third tree structure 403 can include borrowed tree portions that span multiple generations (e.g., generations G1 and G2). In some implementations, a tree can borrow a portion that the tree of the preceding generation borrowed from the tree of an earlier generation. For example, in FIG. 4D, the second tree structure 402 shares the leaf node 434-1 from the first tree structure 401, and therefore the third tree structure 403 can also share the leaf node 434-1. However, no tree can borrow a portion from a later generation (e.g., the first tree structure 401 cannot borrow any portion of the second tree structure 402).

Referring again to the third root node 411-3, the child pointer P2 is associated with a G3 generation identifier, thereby indicating that the child indirect node 425-3 is associated with the third generation G3. As shown, the indirect node 425-3 includes the set of fence pointers 428 and a buffer chunk 429. In particular, the fence pointers 428 include a fence pointer F6 that points to the buffer chunk 429 and is associated with a G3 generation identifier. Further, the buffer chunk 429 includes the key-value pairs K6' and K7' that are also associated with a G3 generation identifier.

As shown in FIG. 4D, the fence pointers 428 also include a fence pointer F4 that points to the buffer chunk 427 that is associated with a G2 generation identifier, and therefore the fence pointer F4 is also associated with a G2 generation identifier. Note that the fence pointer F4 of the indirect node 425-3 (in third tree structure 403) points to the buffer chunk 427 included in the indirect node 425-2 (in second tree structure 402). Accordingly, in the example of FIG. 4D, the third tree structure 403 does not store a copy of the buffer chunk 427, and instead borrows the buffer chunk 427 (associated with generation G2) from the second tree structure 402.

As discussed above, the indirect node 425-3 includes elements associated with generation G3 (i.e., fence pointer F6 and key-value pairs K6' and K7' in the buffer chunk 429), and therefore the indirect node 425-3 is associated with a G3 generation identifier. However, note that the child pointers P5 and P6 of the indirect node 425-3 point to the leaf nodes 433-1 and 434-1 of the first tree structure 401, and therefore the child pointers P5 and P6 are associated with a G1 generation identifier.

Figure 4E:
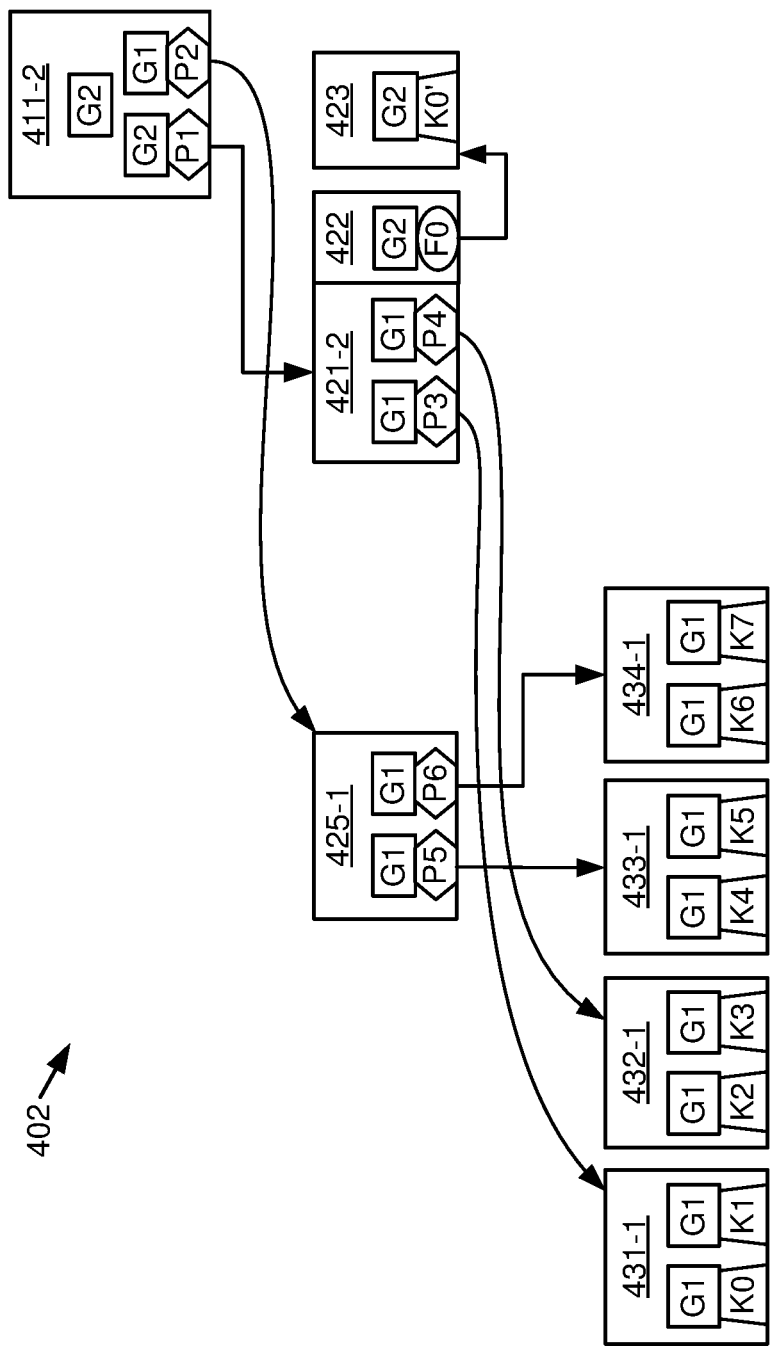

Referring now to FIG. 4E, shown is the second tree structure 402 in an example in which the G1 snapshot has been eliminated (e.g., after it is no longer needed). Accordingly, any portions of the first tree structure 401 that were not shared with the second tree structure 402 have been deleted, and the portions that were formerly shared will remain in the second tree structure 402. Note that, while FIG. 4E illustrates an example in which the oldest snapshot (i.e., G1) is deleted, implementations are not limited in this regard. For example, a snapshot that is chronologically between two other snapshots may be deleted, and only the non-shared portions of the deleted snapshot would be deleted.

5A. Process for Updating Key-Value Index

Figure 5A:
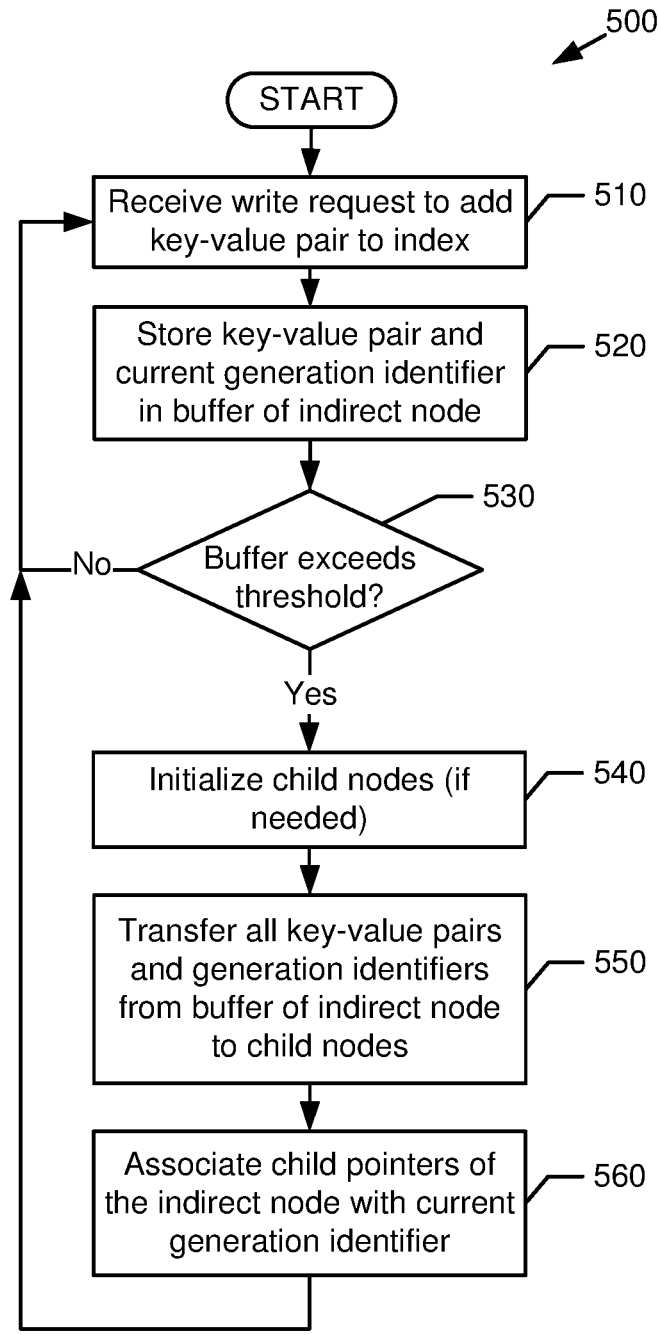
FIGS. 5A-5B are illustrations of example processes, in accordance with some implementations.

FIG. 5A shows an example process 500, in accordance with some implementations. In some examples, the process 500 may be performed using some or all of the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-4E, which show examples in accordance with some implementations. However, other implementations are also possible.

Block 510 may include receiving a write request to add a key-value pair to an index. For example, referring to FIG. 1, the update engine 120 may store the update 105 in the update buffer 135, and the merge engine 150 may update the key-value index 145 with key-value pair data stored in the update buffer 135. In some examples, the key-value index 145 may be arranged in a tree structure including multiple nodes. Further, in some examples, the key-value index 145 may map fingerprints of data units to locations of those data units.

Block 520 may include storing the key-value pair and a current generation identifier in a node buffer of an indirect node of the index. Assume that, in the example of FIG. 5A, the indirect node is more than one level above any leaf nodes. Stated differently, in the example of FIG. 5A, any child nodes of the indirect node that stores the key-value pair (at block 520) are also indirect nodes. For example, referring to FIGS. 1-3A, the storage controller 110 and/or the merge engine 150 may store the received key-value pair with the current generation identifier (e.g., "G2") in buffer chunks 345 of the root node 211. Further, the storage controller 110 may generate or update fence pointers 320 to identify the buffer chunks 345. In some implementations, the fence pointers 320 may be inserted or appended with the current generation identifier. Furthermore, in some examples, a Bloom filter 330 of the root node 211 may be configured (e.g., by setting bit values) to indicate that the received key-value pair is stored in the node buffer 340 of the root node 211.

Diamond 530 may include determining whether the node buffer of the indirect node exceeds a predefined threshold. If it is determined that the node buffer does not exceed the threshold, then the process 500 may return to block 510 (i.e., to receive another key-value pair). For example, referring to FIGS. 1-3A, the storage controller 110 may determine whether the node buffer 340 of root node 211 exceeds a predefined fill level (e.g., 90% full, 100% full, a given number of key-value pairs, and so forth).

However, if it is determined at diamond 530 that the node buffer exceeds the threshold, then the process 500 may continue at block 540, which may include initializing child nodes (if needed). In some implementations, child nodes may be initialized if the indirect node does not already have existing child indirect nodes. For example, referring to FIGS. 1-4D, the storage controller 110 may determine that the node buffer 340 of the root node 211 has been filled to a predefined level, and in response may determine whether the root node 211 has any immediate child nodes (i.e., any child nodes that are one level below the root node 211). Note that, as shown in FIG. 2, the immediate child nodes of root node 211 are indirect nodes and not leaf nodes. If the storage controller 110 determines that the root node 211 does not have any existing child indirect nodes, then the storage controller 110 may initialize child indirect nodes of the root node 211. In some implementations, initializing the child indirect nodes may include determining a node buffer size for the child indirect nodes based on a level ratio. In some examples, the level ratio may be a computed ratio between total buffer sizes in two adjacent levels of the key-value index 200. Therefore, in such examples, the total buffer sizes of indirect nodes 221-224 may be different from the size of the node buffer of root node 211. Further, the node buffer of each of indirect nodes 221-224 may be different (e.g., smaller or larger) than the node buffer of root node 211. Furthermore, in some examples, initializing the child indirect nodes may include determining a Bloom filter size for the child indirect nodes. For example, the storage controller 110 may determine a Bloom filter size for child nodes of the root node 211 based on false positive ratios associated with different levels of the key-value index 200.

After block 540, then the process 500 may continue at block 550, which may include transferring all key-value pairs and their associated generation identifiers from the node buffer of the indirect node to the node buffers of the child nodes. For example, referring to FIGS. 1-4D, the storage controller 110 may transfer all key-value pairs and their generation identifiers from the node buffer of the root node 211 to the node buffers of the child nodes 221-224. The transferred key-value pairs may be distributed to the child nodes 221-224 according to different key ranges associated with the child nodes 221-224. In some examples, the storage controller 110 may also set the Bloom filters of the child nodes to indicate that the transferred key-value pairs are stored in the corresponding node buffer.

Block 560 may include associating child pointers of the indirect node with the current generation identifier. For example, referring to FIGS. 1-4D, upon transferring key-value pairs to the child nodes 221-224, the storage controller 110 may update some or all of the child pointers of the indirect node to include the current generation identifier (e.g., if the associated child nodes were updated with transferred key-value pairs). After block 560, the process 500 may return to block 510 (i.e., to continue receiving write requests to add key-value pairs to the index). Note that process 500 may be similarly repeated for different indirect nodes of the key-value index 200 (e.g., for each of indirect nodes 221-224, 231-234), and may also be repeated at the same indirect node (e.g., for multiple compactions).

5B. Process for Adding a New Generation

Figure 5B:
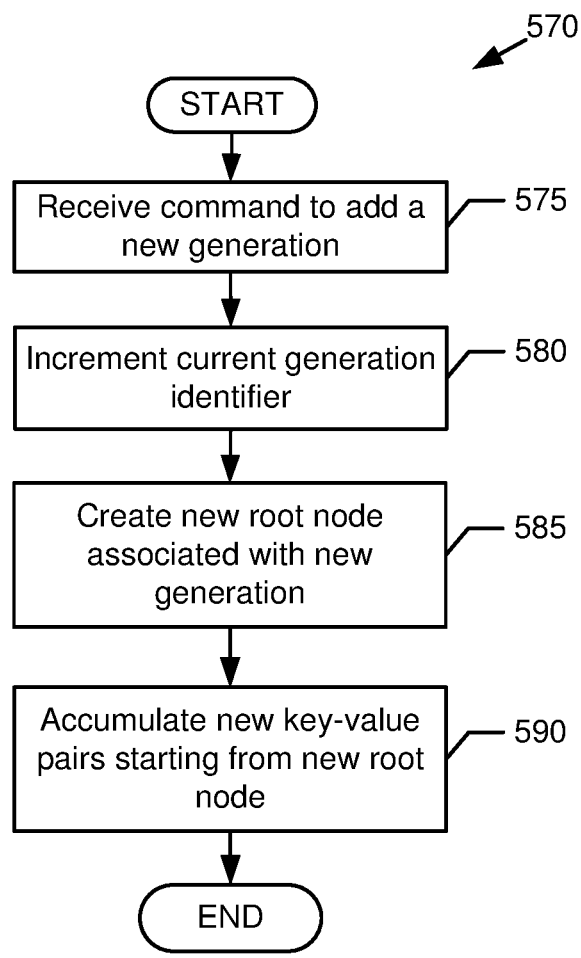

FIG. 5B shows an example process 570, in accordance with some implementations. In some examples, the process 570 may be performed using some or all of the storage controller 110 (shown in FIG. 1). The process 570 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 570 may be described below with reference to FIGS. 1-4E, which show examples in accordance with some implementations. However, other implementations are also possible.

Block 575 may include receiving a command to add a new generation to a key-value index. Block 580 may include incrementing the current generation identifier. For example, referring to FIGS. 1 and 4A, the snapshot engine 170 may receive a user or system command to add a new generation to the key-value index represented by the first tree structure 401. In response to the command, the snapshot engine 170 may increment the current generation from G1 to G2. In some examples, the process of adding the new generation G2 may include finalizing the previous generation G1. Such finalizing may include completing all pending updates to the first tree structure 401 (e.g., in update buffer 135 shown in FIG. 1). Further, in some examples, such finalizing may include designating or indicating that the first tree structure 401 for the previous generation G1 is frozen (i.e., cannot be changed).

Block 585 may include creating a new root node associated with the new generation. Block 590 may include accumulating new key-value pairs starting from the new root node. For example, referring to FIGS. 1 and 4B, the snapshot engine 170 may generate the new root node 411-2 associated with the new generation G2. Further, during the remainder of the time period associated with the second generation G2, updates may be added to the root node 411-2, with all new elements being associated with the G2 identifier. Furthermore, these updates may trigger a compaction process, thereby adding new child nodes to the second tree structure 402 (e.g., indirect node 421-2 shown in FIG. 4B). After block 590, the process 570 may be completed.

Note that, while FIG. 5B shows one example process for adding a new generation, other variations are possible. For example, in some implementations, after the generation identifier is incremented to G2, any new updates may be appended with the G2 identifier, and may be accumulated in an update buffer (e.g., update buffer 135 shown in FIG. 1) without being added to a tree structure (e.g., second tree structure 402 shown in FIG. 4B). Subsequently, when the generation identifier is incremented to G3, the accumulated G2 updates may be used to generate and finalize the G2 snapshot at that time. In such examples, the root node of the G2 snapshot may be created as the last node added to the tree structure of the G2 snapshot.

6. Process for Reading from a Snapshot

Figure 6:
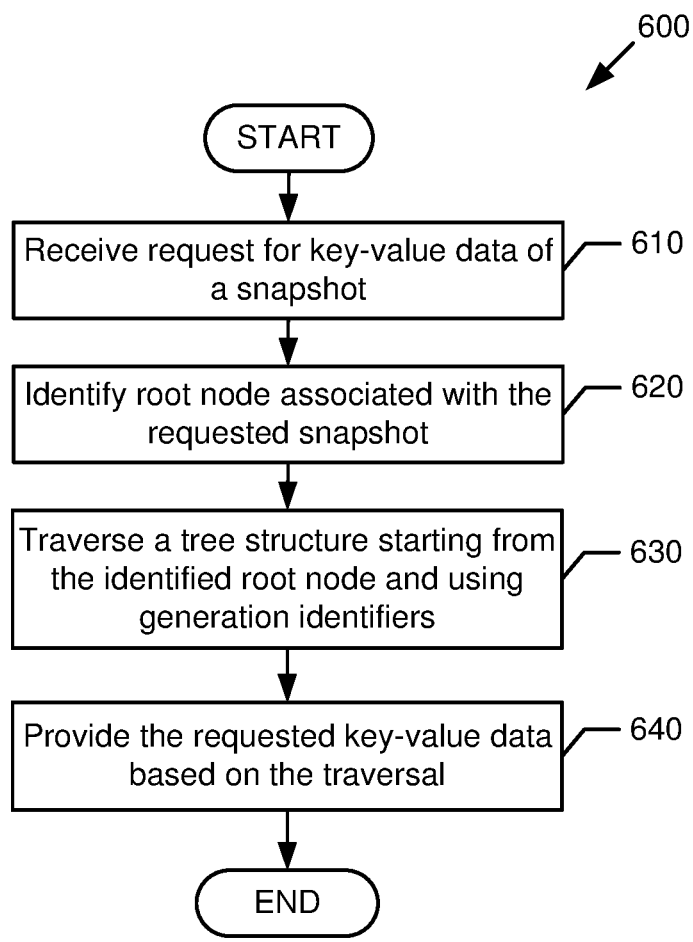
FIG. 6 is an illustration of an example process, in accordance with some implementations.

FIG. 6 shows an example process 600, in accordance with some implementations. In some examples, the process 600 may be performed using some or all of the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-4D, which show examples in accordance with some implementations. However, other implementations are also possible.

Block 610 may include receiving a request for key-value data of a snapshot. For example, referring to FIG. 1, the snapshot engine 170 may receive a request to read data of the snapshot associated with generation G1 (e.g., represented by the first tree structure 401 shown in FIGS. 4A-4C).

Block 620 may include identifying the root node associated with the requested snapshot. For example, referring to FIGS. 1 and 4C, the snapshot engine 170 may select the root node 411-1 if the requested snapshot is associated with generation G1. In another example, the snapshot engine 170 may select the root node 411-2 if the requested snapshot is associated with generation G2.

Block 630 may include traversing a tree structure starting from the identified root node and using generation identifiers. For example, referring to FIGS. 1 and 4C, the snapshot engine 170 may obtain data of the G2 snapshot by performing a traversal beginning at the root node 411-2 (associated with generation G2), and may then follow the child pointers P1 and P2 to identify the child indirect nodes 421-2 and 425-2. Next, the traversal may follow the child pointers P3, P4, P5, and P6 (included in indirect nodes 421-2 and 425-2) to identify the child leaf nodes 431-2, 432-1, 433-1, and 434-1. Note that this traversal includes pointers and key-value pairs that are not associated with the G2 generation identifier (e.g., pointer P5, key-value pair K2, etc.). Accordingly, in some implementations, such elements having an identifier from an earlier generation may also be included in the traversal associated with the G2 generation.

Block 640 may include providing the requested data based on the traversal. For example, referring to FIGS. 1 and 4C, the snapshot engine 170 may read the values associated with keys 0-7 from the second tree structure 402. In some implementations, if the traversal encounters values for a particular key at two or more levels of the tree, the value found at the highest of the two or more levels will belong to the most recent generation. Stated differently, the generation identifier of the value found at the higher level can be greater than or equal to (but not less than) the generation identifier of the value found at the lower level. Accordingly, the value found at the highest of the two or more levels will be used as the data of the snapshot, and the remaining value(s) are ignored. For example, in the second tree structure 402 shown in FIG. 4C, the key-value pair K4' (included in buffer chunk 427 of indirect node 425-2, and associated with G2) is used as the snapshot value, while the key-value pair K4 (included in leaf node 433-1, and associated with G1) is ignored. After block 640, the process 600 may be completed.

7. Process for Reading from a Snapshot

Figure 7:
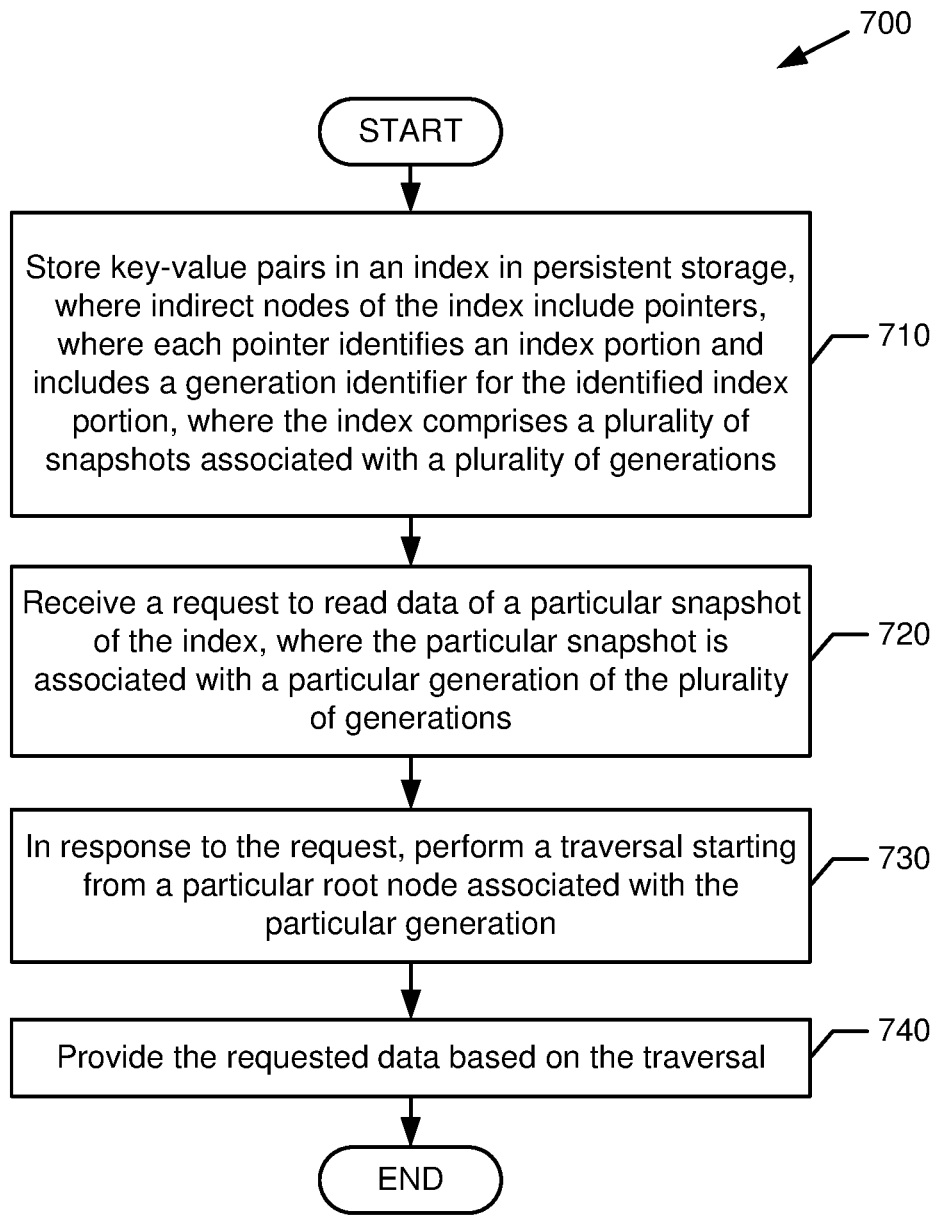
FIG. 7 is an illustration of an example process, in accordance with some implementations.

FIG. 7 shows an example process 700, in accordance with some implementations. In some examples, the process 700 may be performed using some or all of the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-4D, which show examples in accordance with some implementations. However, other implementations are also possible.

Block 710 may include storing key-value pairs in an index in persistent storage, where indirect nodes of the index include pointers, where each pointer identifies an index portion and includes a generation identifier for the identified index portion, where the index comprises a plurality of snapshots associated with a plurality of generations. For example, referring to FIGS. 1-4D, the storage controller 110 and/or the merge engine 150 may store key-value pairs and associated generation identifiers in the key-value index 145. The key-value data may be stored in tree structures that correspond to different generations. Further, each tree structure may include a root node that is associated with a particular generation (e.g., root node 411-1 associated with generation G1, root node 411-2 associated with generation G2, root node 411-3 associated with generation G3). The indirect nodes of the key-value index may include pointers to index portions such as child nodes and buffer chunks. For example, referring to FIG. 4B, the indirect node 421-2 includes child pointers P3 and P4 (identifying leaf nodes 431-1 and 432-1, respectively) and fence pointer FO (identifying buffer chunk 423). The pointers P3, P4, and FO are each associated with a generation identifier (e.g., G1, G2) for the identified index portion.

Block 720 may include receiving a request to read data of a particular snapshot of the index, where the particular snapshot is associated with a particular generation of the plurality of generations. For example, referring to FIG. 1, the snapshot engine 170 may receive a request to read data of a snapshot of the key-value index 145. In some examples, the requested snapshot may correspond to a particular generation (e.g., G2) associated with the key-value index 145.

Block 730 may include, in response to the request, performing a traversal starting from a particular root node associated with the particular generation. For example, referring to FIGS. 1 and 4D, the snapshot engine 170 may identify the root node 411-2 as corresponding to the generation G2 (associated with the requested snapshot). The snapshot engine 170 may then follow the child pointers P1 and P2 (included in root node 411-2) to identify the child indirect nodes 421-2 and 425-2. Next, the snapshot engine 170 may follow the child pointers P3, P4, P5, and P6 (included in indirect nodes 421-2 and 425-2) to identify the child leaf nodes 431-2, 432-1, 433-1, and 434-1.

Block 740 may include providing the requested data based on the traversal. For example, referring to FIGS. 1 and 4C, the snapshot engine 170 may read the values associated with keys 0-7 from the second tree structure 402. After block 740, the process 700 may be completed.

8. Instructions for Reading from a Snapshot

Figure 8:
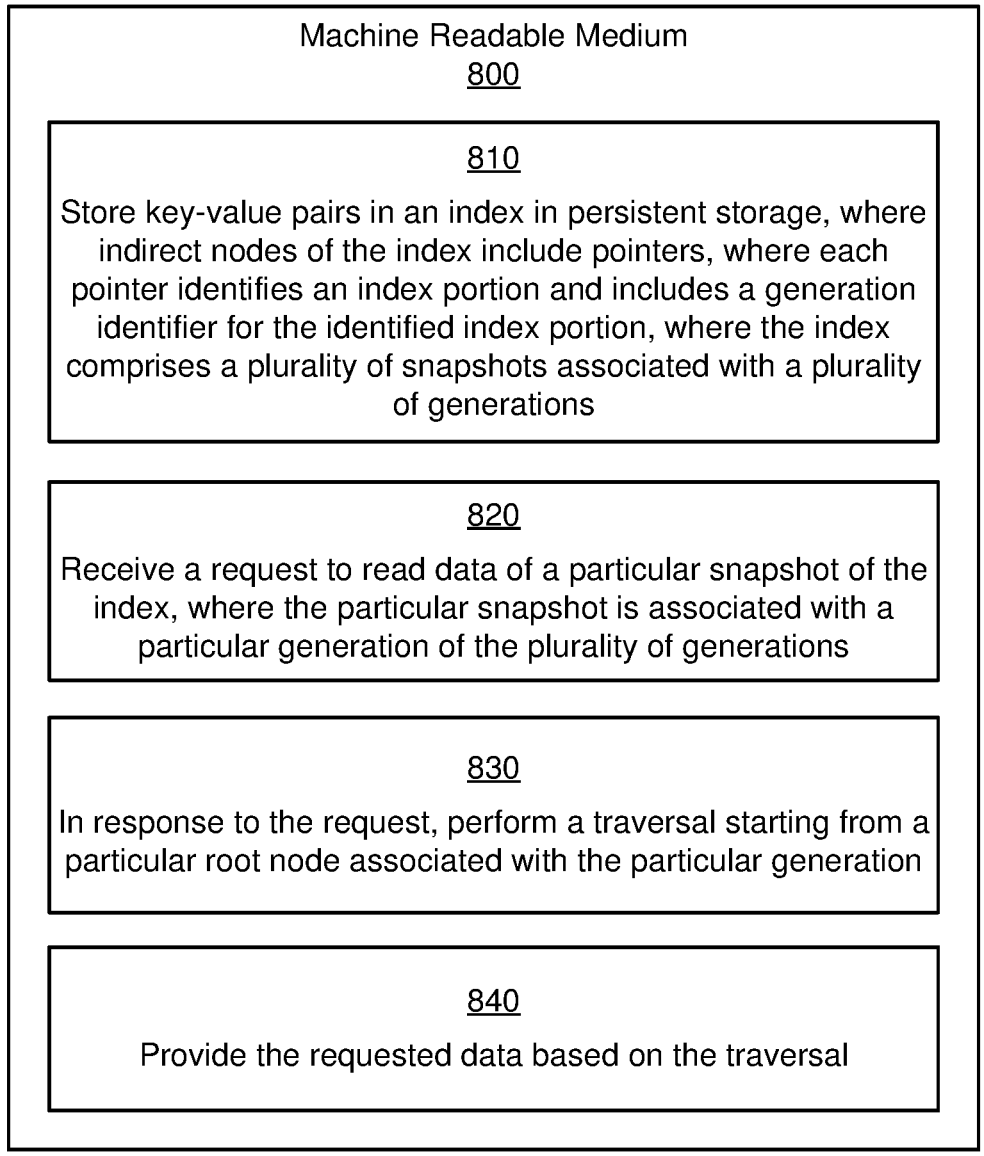
FIG. 8 is a diagram of an example machine-readable medium storing instructions in accordance with some implementations.

FIG. 8 shows a machine-readable medium 800 storing instructions 810-840, in accordance with some implementations. The instructions 810-840 can be executed by a single processor, multiple processors, a single processing engine, multiple processing engines, and so forth. The machine-readable medium 800 may be a non-transitory storage medium, such as an optical, semiconductor, or magnetic storage medium.

Instruction 810 may be executed to store key-value pairs in an index in persistent storage, where indirect nodes of the index include pointers, where each pointer identifies an index portion and includes a generation identifier for the identified index portion, where the index comprises a plurality of snapshots associated with a plurality of generations. Instruction 820 may be executed to receive a request to read data of a particular snapshot of the index, where the particular snapshot is associated with a particular generation of the plurality of generations. Instruction 830 may be executed to, in response to the request, perform a traversal starting from a particular root node associated with the particular generation. Instruction 840 may be executed to provide the requested data based on the traversal.

9. Device for Reading from a Snapshot

Figure 9:
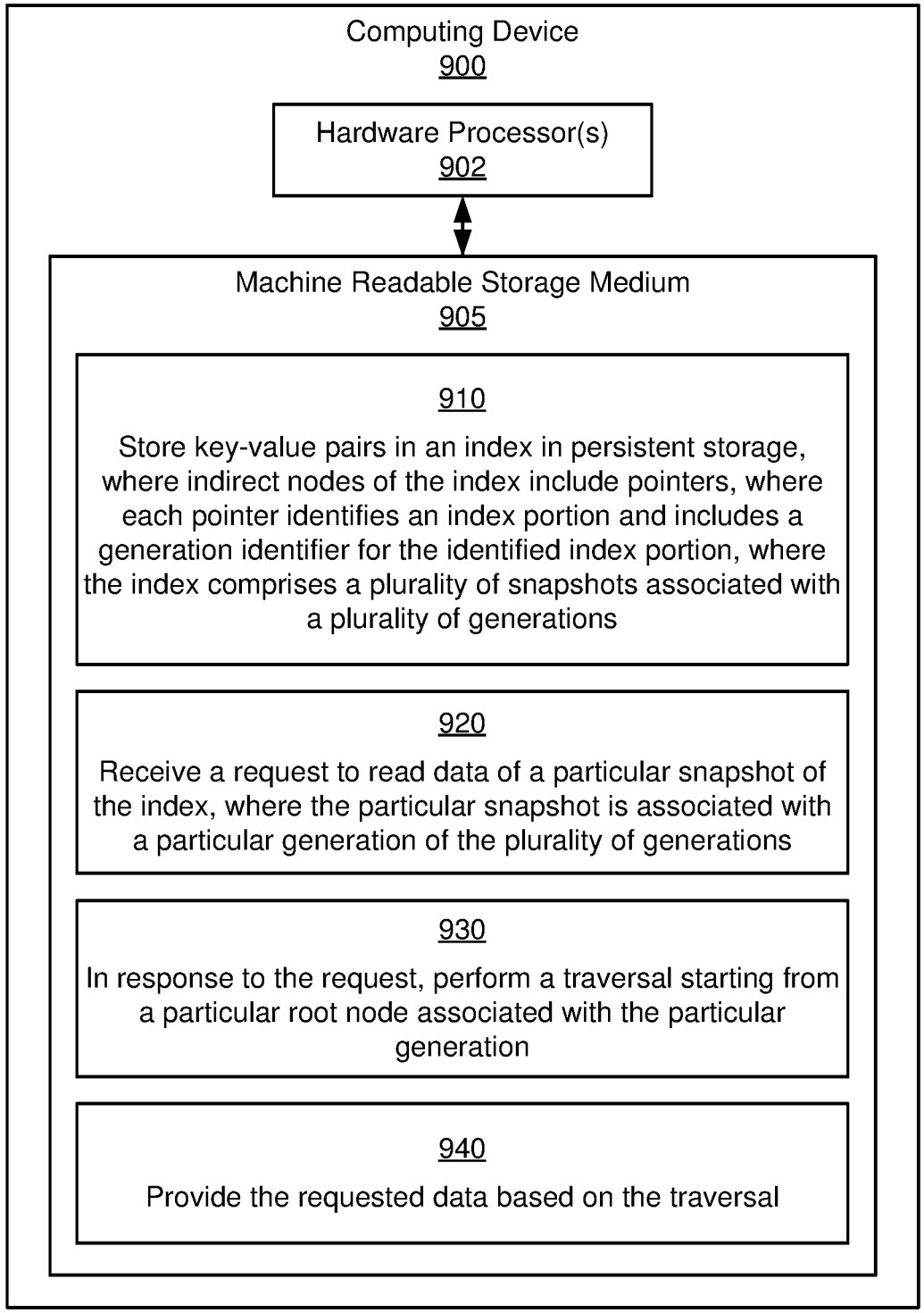
FIG. 9 is a schematic diagram of an example computing device, in accordance with some implementations.

FIG. 9 shows a schematic diagram of an example computing device 900. In some examples, the computing device 900 may correspond generally to the storage system 100 (shown in FIG. 1). As shown, the computing device 900 may include hardware processor 902 and machine-readable storage 905 including instruction 910-940. The machine-readable storage 905 may be a non-transitory medium. The instructions 910-940 may be executed by the hardware processor 902, or by a processing engine included in hardware processor 902.

Instruction 910 may be executed to store key-value pairs in an index in persistent storage, where indirect nodes of the index include pointers, where each pointer identifies an index portion and includes a generation identifier for the identified index portion, where the index comprises a plurality of snapshots associated with a plurality of generations. Instruction 920 may be executed to receive a request to read data of a particular snapshot of the index, where the particular snapshot is associated with a particular generation of the plurality of generations. Instruction 930 may be executed to, in response to the request, perform a traversal starting from a particular root node associated with the particular generation. Instruction 940 may be executed to provide the requested data based on the traversal.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that update engine 120 and the query engine 160 may be combined into a single engine or unit, or may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
  storing key-value pairs in an index in persistent storage, wherein:
    indirect nodes of the index include pointers, wherein each pointer identifies an index portion and is associated with a generation identifier for the identified index portion, wherein the index comprises a plurality of snapshots associated with a plurality of generations;
    a first indirect node includes a first pointer to a child node, and the first pointer is associated with a first generation identifier for the child node; and
    the first indirect node includes a second pointer to a buffer chunk stored in the first indirect node, and the second pointer includes a second generation identifier for the buffer chunk;
  receiving a request to read data of a particular snapshot of the index, wherein the particular snapshot is associated with a particular generation of the plurality of generations;
  in response to the request, performing a traversal starting from a particular root node associated with the particular generation; and
  providing the requested data based on the traversal.

2. The computer implemented method of claim 1, wherein the traversal is performed using the generation identifiers associated with the pointers of the indirect nodes.

3. The computer implemented method of claim 1, wherein the particular snapshot includes:

a first set of key-value pairs associated with the particular generation; and a second set of key-value pairs associated with a different generation, wherein the different generation is older than the particular generation, wherein the second set of key-value pairs is shared by the particular snapshot and a different snapshot.

4. The computer implemented method of claim 1, wherein the first generation identifier and the second generation identifier are associated with different generations.

5. The computer implemented method of claim 1, wherein:

the first indirect node is associated with the second generation identifier;

the first indirect node is included in a first tree structure, the first tree structure having a first root node associated with the second generation identifier; and the first indirect node is also included in a second tree structure, the second tree structure having a second root node associated with a third generation identifier, wherein the second generation identifier and the third generation identifier are associated with different generations.

6. The computer implemented method of claim 1, wherein each key-value pair in the index is associated with a respective generation identifier.

7. The computer implemented method of claim 1, wherein each of the pointers includes the associated generation identifier.

8. The computer implemented method of claim 7, wherein, for each of the pointers, the associated generation identifier is included in a field of the pointer.

9. A non-transitory machine-readable medium storing instructions that upon execution cause a processor to:

store key-value pairs in an index in persistent storage, wherein:

indirect nodes of the index include pointers, wherein each pointer identifies an index portion and is associated with a generation identifier for the identified index portion, wherein the index comprises a plurality of snapshots associated with a plurality of generations;

a first indirect node includes a first pointer to a child node, and the first pointer is associated with a first generation identifier for the child node; and the first indirect node includes a second pointer to a buffer chunk stored in the first indirect node, wherein the second pointer is associated with a second generation identifier for the buffer chunk;

receive a request to read data of a particular snapshot of the index, wherein the particular snapshot is associated with a particular generation of the plurality of generations;

in response to the request, perform a traversal starting from a particular root node associated with the particular generation; and provide the requested data based on the traversal.

10. The non-transitory machine-readable medium of claim 9, wherein the traversal is performed using the generation identifiers associated with the pointers of the indirect nodes.

11. The non-transitory machine-readable medium of claim 9, wherein the particular snapshot includes:

a first set of key-value pairs associated with the particular generation; and a second set of key-value pairs associated with a different generation, wherein the different generation is older than the particular generation, wherein the second set of key-value pairs is shared by the particular snapshot and a different snapshot.

12. The non-transitory machine-readable medium of claim 9, wherein:

the first indirect node is associated with the second generation identifier;

the first indirect node is included in a first tree structure, the first tree structure having a first root node associated with the second generation identifier; and the first indirect node is included in a second tree structure, the second tree structure having a second root node associated with a third generation identifier, wherein the second generation identifier and the third generation identifier are associated with different generations.

13. The non-transitory machine-readable medium of claim 9, wherein each of the pointers includes the associated generation identifier.

14. The non-transitory machine-readable medium of claim 13, wherein, for each of the pointers, the associated generation identifier is one portion of an address specified by the pointer.

15. A storage system comprising:

a processor comprising a plurality of processing engines; and a machine-readable storage storing instructions, the instructions executable by the processor to:

store key-value pairs in an index in persistent storage, wherein:

indirect nodes of the index include pointers, wherein each pointer identifies an index portion and is associated with a generation identifier for the identified index portion, wherein the index comprises a plurality of snapshots associated with a plurality of generations;

a first indirect node includes a first pointer to a child node, and the first pointer is associated with a first generation identifier for the child node; and the first indirect node includes a second pointer to a buffer chunk stored in the first indirect node, and wherein the second pointer is associated with a second generation identifier for the buffer chunk;

receive a request to read data of a particular snapshot of the index, wherein the particular snapshot is associated with a particular generation of the plurality of generations;

in response to the request, perform a traversal starting from a particular root node associated with the particular generation; and provide the requested data based on the traversal.

16. The storage system of claim 15, wherein the traversal is performed using the generation identifiers associated with the pointers of the indirect nodes.

17. The storage system of claim 15, wherein the particular snapshot includes:

a first set of key-value pairs associated with the particular generation; and a second set of key-value pairs associated with a different generation, wherein the different generation is older than the particular generation, wherein the second set of key-value pairs is shared by the particular snapshot and a different snapshot.

18. The storage system of claim 15, wherein:

the first indirect node is associated with the second generation identifier;

the first indirect node is included in a first tree structure, the first tree structure having a first root node associated with the second generation identifier; and the first indirect node is included in a second tree structure, the second tree structure having a second root node associated with a third generation identifier, wherein the second generation identifier and the third generation identifier are associated with different generations.

19. The storage system of claim 15, wherein each of the pointers includes the associated generation identifier.

20. The computer implemented method of claim 19, wherein, for each of the pointers, the associated generation identifier is included in a field of the pointer.

* * * * *